July 16, 1968  H. K. ORTHMAN  3,392,791
GROUND CONDITIONING DEVICE
Filed Oct. 22, 1964
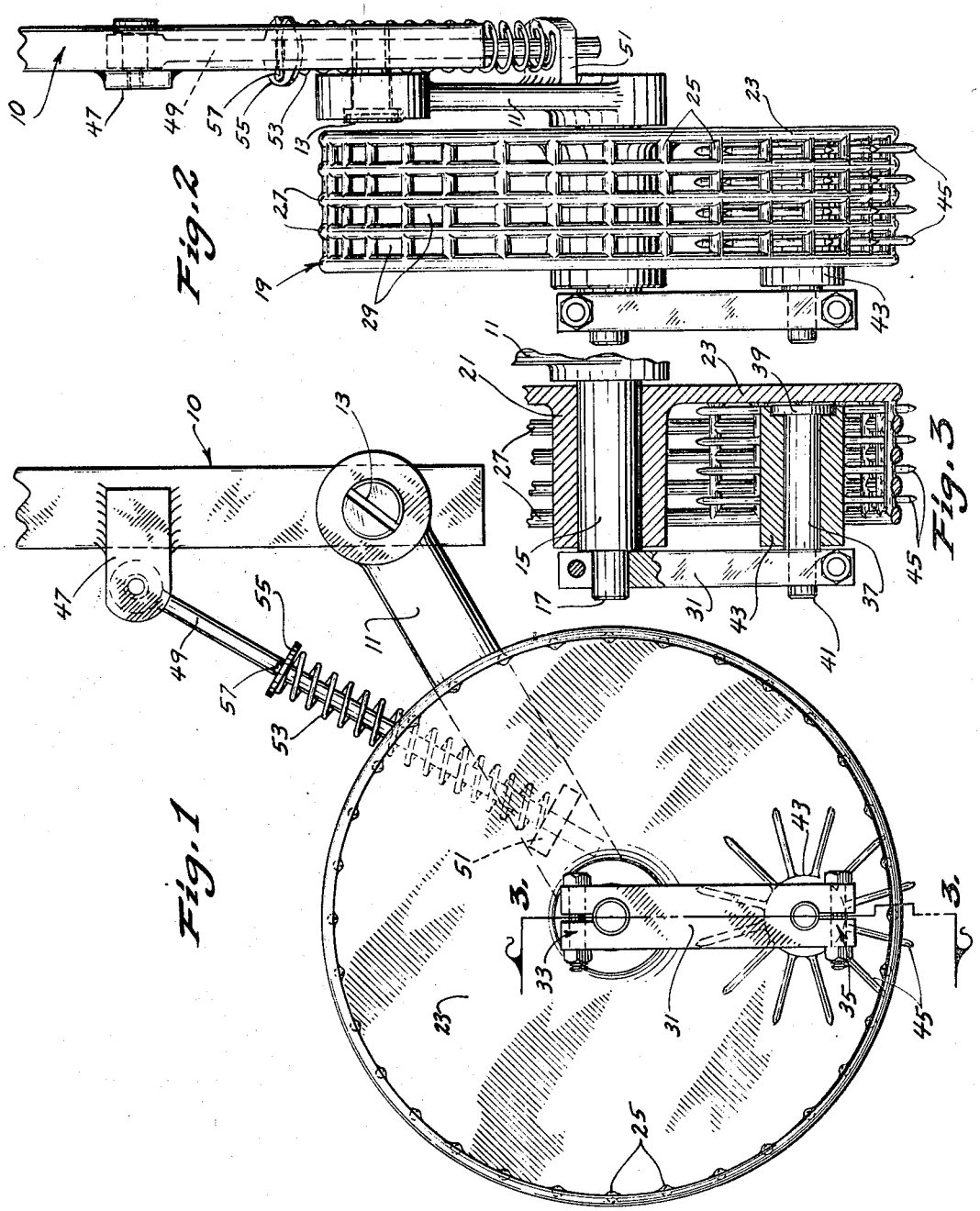
INVENTOR.
*HENRY K. ORTHMAN*
BY
*Duck & Zarley*
*ATTORNEYS*

United States Patent Office 3,392,791
Patented July 16, 1968

3,392,791
GROUND CONDITIONING DEVICE
Henry K. Orthman, Rte. 2, Lexington, Nebr. 68850
Filed Oct. 22, 1964, Ser. No. 405,725
8 Claims. (Cl. 172—105)

ABSTRACT OF THE DISCLOSURE

A ground conditioning device comprising, a ground engaging wheel means rotatably mounted on a supporting structure and having a plurality of openings formed in its periphery, and a spiked wheel means rotatably mounted within the ground engaging wheel means adapted partially to protrude outwardly through a portion of the opening to penetrate into the ground therebelow.

---

This invention relates to a ground conditioning device and more particularly to a ground conditioning device which pulverizes or breaks up the crust of the ground to permit plants to emerge therefrom.

Young plants, particularly sugar beets, have difficulty in penetrating the crust of the ground.

Therefore, it is a principal object of this invention to provide a ground conditioning device which will break up or pulverize the crust to enable the plant to emerge from the ground.

It is a further object of this invention to provide a ground conditioning device which is yieldably held in a ground engaging position by spring means.

A further object of this invention is to provide a ground conditioning device which is adapted to be secured to a conventional farm implement.

A further object of this invention is to provide a ground conditioning device wherein a plurality of spike members extend downwardly through the periphery of a wheel means to break up the crust of the ground.

A further object of this invention is to provide a ground conditioning device which may be adjusted to penetrate to different depths in the ground.

A further object of this invention is otprovide a ground conditioning device that is self-cleaning.

A further object of this invention is to provide a ground conditioning device which is substantially maintenance free.

A still further object of this invention is to provide a ground conditioning device that is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a side elevational view of the device secured to a downwardly extending support bar;

FIG. 2 is a front elevational view of the device; and

FIG. 3 is a sectional view of the device as seen on line 3—3 of FIG. 1.

The numeral 10 designates a support bar which is shown to be vertical in the drawings but could be inclined as well. Support bar 10 could extend from any suitable farm implement such as a cultivator or the like. An arm member 11 is pivotally secured to the lower end of support bar 10 by means of pin member 13 extending through arm member 11 and being threadably received by support bar 10 as seen in FIG. 2.

The lower end of arm member 11 is provided with an axle 15 extending horizontally outwardly therefrom and having a reduced diameter portion 17 formed in its outer end. A wheel means 19 having a central hub portion 21 is rotatably mounted on axle 15 inwardly of reduced diameter portion 17 as seen in FIGS. 2 and 3. Integral with hub portion 21 is a circular disk portion 23 extending radially outwardly from the innermost portion of hub portion 21. A plurality of cross members 25 extend horizontally outwardly from the periphery of disk portion 23 in an equally spaced relation as best seen in FIG. 3. Integrally formed with cross members 25 are a plurality of vertically disposed circular rib members 27 thereby providing a plurality of open spaces 29 in the periphery of wheel means 19.

Selectively pivotally secured to reduced diameter portion 17 is an arm member 31 having clamping means 33 and 35 on its opposite ends respectively. An axle 37 is clamped in clamping means 35 and extends horizontally inwardly towards disk members 23 and has a head portion 39 on its inner end and the reduced diameter portion 41 on its outer end which is received by clamping means 35.

Rotatably mounted on axle 37 is a hub means 43 having a recessed area on its inner end which receives head portion 39 of axle 37 to prevent undesirable contact between hub means 43 and disk 23. Hub means 43 is provided with a plurality of spike members 45, secured thereto by means of welding or the like, radially extending outwardly from the periphery thereof. As seen in FIGS. 1, 2 and 3, the lower ends of a portion of spike members 45 extend outwardly through openings 29 in wheel means 19.

Support bar 10 has an ear member 47 secured thereto by welding or the like which extends rearwardly therefrom at a point above the pivotal connection of arm member 11 to which is pivotally connected a shaft 49 normally extending downwardly and rearwardly therefrom. Shaft 49 is slidably received by an ear member 51 which is secured to arm member 11 by welding or the like. A spring means 53 embraces shaft 49 between ear member 51 and washer member 55. Washer member 55 is restricted in its upward movement by key 57 extending through shaft 49. If so desired, a key could be extended through the lower end of shaft 49 at a point below ear member 51 to prevent shaft 49 from disengaging from ear member 51.

The normal method of operation is as follows. The device would normally be used to break up the crust of the ground immediately above the planted seeds so that the young plants can break through the ground. While only one device is illustrated in the drawings, it is obvious that a plurality of such devices could be secured to a farm implement to condition the ground over a plurality of rows.

Wheel 19 will be caused to pass over the area immediately above the planted seeds and will be yieldably maintained in a ground engaging position by the force of spring 53 on shaft 49 acting upon ear member 51 in conventional fashion. The lower ends of spikes 45 which extend outwardly through openings 29 in wheel means 19. pierce the ground as wheel 19 is rotatably moved along the ground. The combined action of the spike members 45, ribs 27 and cross members 25 completely break up or pulverize the ground coming into contact therewith due to the unique arrangement of wheel means 19 and spikes 45 extending therethrough.

If it is desired to decrease the penetration of spikes 45 into the ground, it is simply necessary to loosen clamp means 33 and pivot arm member 31 about reduced diameter portion 17 of axle 15 either forwardly or rearwardly from the position seen in FIG. 1. The pivotal movement of arm member 31 moves hub 43 and spike members 45 upwardly from the lowermost portion of wheel means 19 and necessarily reduces the length of spike members 45 which will be extending outwardly through this lowermost portion of wheel means 19 which is engaging the ground. Thus it can be seen that the device can be adjusted to achieve any desired penetration of the ground by merely adjusting the relationship of arm members 31 with respect to the lower most portion of wheel means 19.

The pivotal action of arm member 11 permits wheel means 19 to pass over uneven surfaces without damage to the device.

While the drawings illustrate one device it is obvious that as many devices as desired could be secured to a farm implement to condition the ground over a plurality of rows.

It can be appreciated that the device will be self cleaning due to spikes 45 being first extended through openings 29 and when withdrawn as the device rotates.

The device is preferably constructed of iron or steel to insure its durability and use. It can be appreciated that the device, due to its limited number of moving parts, will be extremely economical of manufacture.

Thus from the foregoing it can be seen that the device accomplishes at least all of its stated objectives.

Some changes may be made in the construction and arrangement of my Ground Conditioning Device without departing from the real spirit and purpose of my invention, and it is my intention to cover by my claims, any modified forms of structure or use of mechanical equivalents which may be reasonably included within their scope.

I claim:

1. A ground conditioning device, comprising in combination:
    a first arm member having upper and lower ends adapted to be vertically, pivotally secured at its upper end to a supporting structure,
    a first axle member secured to and extending horizontally outwardly from the lower end of said first arm member,
    a cylindrical shaped ground engaging wheel means rotatably mounted on said first axle and having a plurality of openings formed in its periphery,
    a second arm member pivotally secured to said first axle member and extending downwardly therefrom,
    a second axle member secured to said second arm member and extending horizontally therefrom,
    and a spiked wheel means rotatably mounted on said second axle member within said cylindrical shaped ground engaging wheel means and partially protruding outwardly through a portion of said openings beyond the periphery of said ground engaging wheel means.

2. The device of claim 1 wherein the periphery of said ground engaging wheel means is comprised of a plurality of vertically disposed circular rib members and a plurality of integral cross members extending therebetween.

3. The device of claim 1 wherein said ground engaging wheel means includes a hub member rotatably mounted on said second axle member, said ground engaging wheel means having vertical disk member secured at its center to one end of said hub member; said disk member having a plurality of cross-bars extending horizontally outwardly from its periphery and a plurality of vertically disposed, circular rib members secured to said cross-members.

4. The device of claim 1 wherein said spiked wheel means includes a plurality of spikes extending radially outwardly from a central hub portion rotatably mounted on said second axle member.

5. The device of claim 1 wherein said ground engaging wheel means is yieldably maintained in a ground engaging position by a resilient means operatively connected to and extending between said supporting structure and said first arm member.

6. The device of claim 1 wherein said spiked wheel means includes a plurality of spikes extending radially outwardly from a central hub portion rotatably mounted on said second axle member; said spikes partially extending outwardly through said openings in the periphery of said ground engaging beyond the periphery of said ground engaging wheel means, said second arm member being selectively pivotally movable with respect to said first axle member to permit said spiked wheel means to be moved from its lowermost position with respect to said ground engaging wheel means to a higher position, said spikes penetrating the ground to the greatest extent when said spiked wheel means is in its lowermost position.

7. A ground conditioning device, comprising in combination:
    a ground engaging wheel means rotatably mounted on a supporting structure and having a plurality of openings formed in its periphery,
    and a spiked wheel means rotatably mounted within said ground engaging wheel means and partially protruding outwardly through a portion of said openings beyond the periphery of said ground engaging wheel means,
    the axes of said ground engaging wheel means and said spiked wheel means normally being in the same vertical plane,
    the axis of said spiked wheel means being selectively adjustable outwardly with respect to said vertical plane.

8. A ground conditioning device comprising in combination:
    a ground engaging wheel means rotatably mounted on a supporting structure and having a plurality of openings formed in its periphery,
    an arm member secured to supporting structure and extending downwardly therefrom,
    and a spiked wheel means rotatably mounted on said arm member within said ground engaging wheel means and partially protruding outwardly through a portion of said openings beyond the periphery of said ground engaging wheel means.

References Cited

UNITED STATES PATENTS

| 2,582,199 | 1/1952 | Gardner et al. | 172—547 |
| 3,101,123 | 8/1963 | Schmidt | 172—49 |

FOREIGN PATENTS 667,904   3/1952   Great Britain.

ABRAHAM G. STONE, *Primary Examiner.*

WILLIAM A. SMITH III, *Examiner.*

J. R. OAKS, *Assistant Examiner.*